US008905153B2

(12) United States Patent
Braun et al.

(10) Patent No.: US 8,905,153 B2
(45) Date of Patent: *Dec. 9, 2014

(54) METHOD FOR OPERATING A POWER TOOL HAVING A CLUTCH DEVICE

(75) Inventors: Willy Braun, Neustetten (DE); Juergen Lennartz, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 757 days.

This patent is subject to a terminal disclaimer.

(21) Appl. No.: 13/001,262

(22) PCT Filed: Nov. 27, 2008

(86) PCT No.: PCT/EP2008/066318

§ 371 (c)(1), (2), (4) Date: Jan. 31, 2011

(87) PCT Pub. No.: WO2009/156005

PCT Pub. Date: Dec. 30, 2009

(65) Prior Publication Data

US 2011/0139471 A1 Jun. 16, 2011

(30) Foreign Application Priority Data

Jun. 24, 2008 (DE) ......................... 10 2008 002 594

(51) Int. Cl.

| | |
|---|---|
| ***B23Q 5/00*** | (2006.01) |
| ***B25D 17/08*** | (2006.01) |
| ***B25D 16/00*** | (2006.01) |

(52) U.S. Cl.

CPC ............ *B25D 16/003* (2013.01); *B25D 17/088* (2013.01); *B25D 2216/0015* (2013.01); *B25D 2216/0023* (2013.01); *B25D 2250/205* (2013.01); *B25D 2250/165* (2013.01); *B25D 2250/221* (2013.01); *B25D 2250/101* (2013.01)

USPC ............................................................... 173/4

(58) Field of Classification Search

CPC ...... B25B 23/141; B25B 21/00; B25B 23/14; B25B 21/007; B25B 21/008; B25F 5/001; B25D 2250/165; B25D 16/003; B25D 17/088; B25D 2250/205

USPC ........................................ 173/1–11, 176–183

See application file for complete search history.

(56) References Cited

U.S. PATENT DOCUMENTS 3,318,390 A * 5/1967 Hoza et al. .................... 173/178
3,649,129 A * 3/1972 King, Jr. ....................... 408/139

(Continued)

FOREIGN PATENT DOCUMENTS

DE 2755960 A1 6/1979
DE 8102453 U1 10/1982

(Continued)

*Primary Examiner* — Robert Long

(74) *Attorney, Agent, or Firm* — Maginot, Moore & Beck LLP

(57) ABSTRACT

The invention relates to a method for operating power tool, particularly an electrically driven hand power tool, having at least one tool drive shaft for directly or indirectly rotationally driving a tool insert. The tool insert is received in a tool holder releasably connected to the tool drive shaft. The tool drive shaft can be coupled to a drive device via a clutch device. The clutch device is provided with at least two different limit torques, which are selectable by an operator. When the tool insert and/or the tool holder is changed out, the clutch device is reset to a lower limit torque of the at least two different limit torques, particularly the lowest possible limit torque.

17 Claims, 6 Drawing Sheets

(56) References Cited

U.S. PATENT DOCUMENTS

| | | | | | |
|---|---|---|---|---|---|
| 3,791,756 | A | * | 2/1974 | Johnson | 408/139 |
| 3,975,954 | A | * | 8/1976 | Barnich | 73/862.23 |
| 4,166,488 | A | * | 9/1979 | Irby | 81/28 |
| 4,669,930 | A | * | 6/1987 | Stenmark | 408/140 |
| 4,776,406 | A | | 10/1988 | Wanner | |
| 4,844,177 | A | * | 7/1989 | Robinson et al. | 173/178 |
| 4,856,389 | A | * | 8/1989 | Weber | 81/429 |
| 5,033,552 | A | * | 7/1991 | Hu | 173/217 |
| 5,156,244 | A | * | 10/1992 | Pyles et al. | 477/178 |
| 5,167,309 | A | * | 12/1992 | Albert et al. | 477/178 |
| 5,568,028 | A | * | 10/1996 | Uchiyama et al. | 318/566 |
| 6,516,896 | B1 | * | 2/2003 | Bookshar et al. | 173/1 |
| 6,910,540 | B2 | * | 6/2005 | Totsu | 173/178 |
| 6,942,485 | B1 | * | 9/2005 | Richard | 433/118 |
| 7,096,569 | B1 | * | 8/2006 | Barr et al. | 29/709 |
| 7,314,097 | B2 | * | 1/2008 | Jenner et al. | 173/48 |
| 2002/0134811 | A1 | * | 9/2002 | Napier et al. | 227/131 |
| 2003/0173096 | A1 | * | 9/2003 | Setton et al. | 173/176 |
| 2004/0115014 | A1 | * | 6/2004 | Totsu | 408/199 |
| 2005/0100867 | A1 | * | 5/2005 | Hilscher et al. | 433/216 |
| 2006/0118315 | A1 | * | 6/2006 | Suzuki et al. | 173/2 |
| 2006/0201688 | A1 | | 9/2006 | Jenner et al. | |
| 2010/0032179 | A1 | * | 2/2010 | Hanspers et al. | 173/11 |
| 2011/0139473 | A1 | * | 6/2011 | Braun et al. | 173/20 |
| 2011/0185864 | A1 | * | 8/2011 | Ide | 81/479 |

FOREIGN PATENT DOCUMENTS

| | | | | | |
|---|---|---|---|---|---|
| DE | 3235544 | A1 | | 3/1984 | |
| DE | 3637128 | A1 | | 3/1990 | |
| DE | 3832202 | C1 | | 3/1990 | |
| DE | 10130520 | A1 | * | 1/2003 | B25F 5/00 |
| DE | 102008002589 | A1 | * | 12/2009 | B25D 16/00 |
| EP | 0224010 | A1 | | 6/1987 | |
| EP | 1695796 | A2 | | 8/2006 | |
| EP | 1724068 | A1 | | 11/2006 | |
| WO | WO 2009156004 | A1 | * | 12/2009 | |

* cited by examiner

METHOD FOR OPERATING A POWER TOOL HAVING A CLUTCH DEVICE

CROSS-REFERENCE TO RELATED APPLICATION

This application is a 35 USC 371 application of PCT/EP 2008/066318 filed on Nov. 27, 2008.

BACKGROUND OF THE INVENTION

1. Field of the Invention

The invention relates to a method for operating a power tool, in particular an electrically operable hand-held power tool.

2. Description of the Prior Art

Power tools that provide at least a rotary drive of insert bits usually have overload clutches that limit a torque acting on the insert bit to a particular preselected limit torque. Particularly in hand-held power tools with powerful rotary drive units such as drills, impact drills, or rotary/combi hammers, the preselected limit torque and therefore the overload clutch play an important role in accident prevention. Usually, the preselected limit torque is a compromise between the lowest possible torque load on the insert bit, the power tool, and/or a user and the highest possible working torque for using large tool diameters of the insert bit.

Overload clutches or clutch devices with adjustable limit torques are provided so as to meet the requirements of different work situations. DE 43 04 899 A1 has disclosed a rotary hammer as an example of a hand-held power tool in which at least two separate clutches are provided in the transmission device between a drive source and a rotary drivable tool holder. In this case, the clutches have different limit torques and can be brought into engagement by the user independently of each other so that different limit torques can be in effect during use of the rotary hammer.

In addition, various embodiments of two-stage clutch devices are already known. DE 38 32 302 C1 has disclosed a clutch device with two overload clutches that can be coupled and are arranged in series on a shaft. The overload clutches in this case are selectively connected to each other and/or fastened to a housing by means of a switchable, axially movable pin that is situated in a radially outer region of the overload clutches so that different limit torques are in effect in relation to the shaft.

DE 101 30 520 A1 has also disclosed a clutch device with an overload clutch for hand-held power tools in which the limit torque of the overload clutch can be set by means of a control element. For this purpose, the overload clutch has radially situated spring elements, which are set to a certain prestressing force in order to produce an overload torque and whose prestressing force can be changed by means of a control element.

The power tools described above all have the following method of operation in common: if a user determines that a different limit torque of the overload clutch is required for a more favorable work progress, then the user sets the suitable limit torque with an actuating device of the overload clutch. This is true for both a higher required limit torque and a lower required limit torque. A manual intervention is thus required in both switching directions. The high torque limit can have undesirable repercussions, particularly after a longer work interruption and/or after the insert bit is replaced with one having a required limit torque that is lower than the currently set limit torque.

Usually, even with the use of very powerful power tools, a very high working torque is only required in relatively few specific applications. In the most frequent applications by far, a very good work result can be achieved with a relatively low working torque. An automatic resetting to a lower working torque thus advantageously increases user-friendliness. WO 2004/024398 A1 has disclosed a rotary hammer with a two-stage clutch device in which an automatic resetting of the clutch device to the lowest possible limit torque is triggered as soon as the rotary hammer is disconnected from the line voltage.

ADVANTAGES AND SUMMARY OF THE INVENTION

The method for operating a power tool according to the invention has the advantage that the replacement of an insert bit and/or of a replaceable tool holder is used as an indicator that a different limit torque of the clutch device is probably required.

Another advantage is that potential damage that an excessively high limit torque could cause to an insert bit that is less stable—because it is smaller, for example—can be avoided through the automatic resetting to a lower limit torque, preferably to the lowest possible limit torque. A particular advantage in this case is the automatic resetting to the lowest possible limit torque of the at least two limit torques of the clutch device of the power tool.

In an inexpensive embodiment, at least two different, preferably user-selectable, limit torques MG1, MG2 are provided for the clutch device.

In an advantageous variant of the method according to the invention, when the insert bit and/or the tool holder is replaced, the clutch device is reset to the lowest possible of the at least two limit torques MGMin. In this case, the resetting action preferably occurs automatically.

In another convenient variant of the method according to the invention, when a first actuating element for removing the insert bit from the tool holder is actuated, this triggers a resetting of the clutch device. In particular, an automatic resetting to the lowest possible of the at least two limit torques is produced.

If the clutch device is reset upon insertion of an insert bit into the tool holder, this makes it possible to implement a particularly convenient and rugged embodiment. In a particularly preferred embodiment, upon insertion of the insert bit, the clutch device is automatically reset to the lowest possible of the at least two limit torques.

In a preferred modification, when a second actuating element for replacing the replaceable tool holder is actuated, this triggers an automatic resetting of the clutch device. In particular, an automatic resetting to the lowest possible of the at least two limit torques is produced.

If a torque selecting device of the clutch device sets the lowest possible limit torque in a starting position, then this achieves a particularly efficient implementation of the method according to the invention.

In a particularly rugged embodiment, it is possible to lock the torque selecting device in the currently selected switching position.

A very flexible embodiment of the method according to the invention is includes the following steps:

a removal and/or insertion and/or replacement of an insert bit in the tool holder and/or of the replaceable tool holder is detected and acts on the torque selecting device, which provided in the clutch device, in such a way that the torque selecting device is reset into its starting position.

In a preferred modification of the method according to the invention, the clutch device is reset when there is an interruption in the power supply to the power tool. In particular, the clutch device is automatically reset to the lowest possible of the at least two limit torques.

In another modification of the method according to the invention, at least one optical, acoustic, and/or haptic signal generator, which is provided in the power tool, is activated upon application of a limit torque other than the lowest possible limit torque in the clutch device.

Other advantages, modifications, and enhancements of the method according to the invention ensue from the following description of the exemplary embodiments.

BRIEF DESCRIPTION OF THE DRAWINGS

Exemplary embodiments of the invention are shown in the drawings and will be explained in greater detail in the subsequent description in conjunction with the drawings, in which.

DESCRIPTION OF THE PREFERRED EMBODIMENTS

Figure 1:
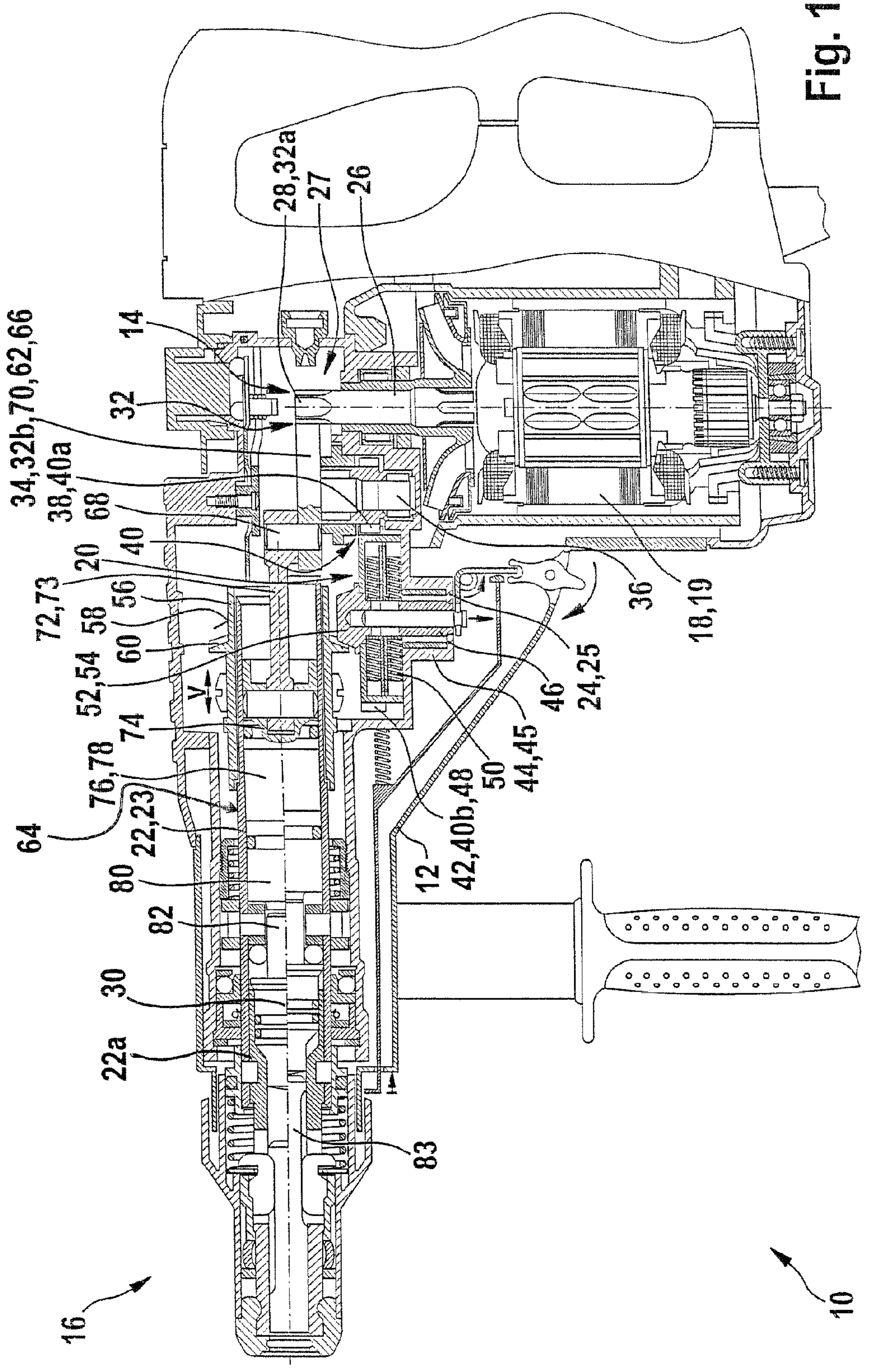
FIG. 1 is a side view of a rotary hammer as a first exemplary embodiment.

FIG. 1 is a sectional side view of a rotary hammer 10, serving as a first exemplary embodiment of a power tool according to the invention, in particular an electrically operable hand-held power tool according to the invention. In a housing 12 of the rotary hammer 10, a drive device 14 is provided for the rotating and/or hammering drive of an insert bit, not shown here, accommodated in a tool holder 16 situated at one end of the housing 12. The drive device 14 has an electric motor 18 as a drive unit 19, a transmission device 20, and a tool drive shaft 23 embodied in the form of a hammer tube 22. The tool holder 16 is situated in an end region 22*a* of the hammer tube 22 oriented away from the drive unit 19 and is connected to the end region 22*a* of the hammer tube 22 for co-rotation therewith, preferably in a detachable fashion and particularly in a replaceable fashion. The hammer tube 22 in this case is rotatably supported in the housing 12. In the embodiment according to FIG. 1, the hammer tube 22 is accommodated and rotatably supported in an inner housing 25 embodied in the form of a transmission support 24. The inner housing 25 is in turn accommodated in the housing 12 and affixed thereto.

The electric motor 18 according to FIG. 1 has a motor shaft 26 whose free end 27 is provided with an output pinion 28. The motor shaft 26 in the present exemplary embodiment is accommodated at an angle to a main axis 30 of the hammer tube 22, in particular at right angles to it. The geometrical arrangement of the motor shaft 26, however, is not essential to the invention. A power tool according to the invention can instead also have arrangements in which the motor shaft 26 is oriented parallel to the tool drive shaft 23.

The output pinion 28 is operatively connected to the hammer tube 22 via the transmission device 20 so that the hammer tube 22 can be driven to rotate by means of a rotary motion of the output pinion 28. In the present exemplary embodiment of a power tool according to the invention as shown in FIG. 1, the transmission device 20 includes a first transmission stage 32. The first transmission stage 32 is constituted on an input side 32*a* by the output pinion 28 and on the output side 32*b* by a first spur gear 34, which meshes with the output pinion 28. The first spur gear 34 is situated on a transmission shaft 36 situated parallel to the motor shaft 26 and is preferably connected to the transmission shaft for co-rotation therewith. The transmission shaft 36 is supported in rotary fashion in the transmission support 24.

The transmission shaft 36 supports a second spur gear 38 that is preferably connected to the transmission shaft 36 for co-rotation therewith. The second spur gear 38 is part of a second transmission stage 40, with the second spur gear 38 functioning as an input side 40*a* of the second transmission stage 40. The second spur gear 38 meshes with a clutch spur gear 42 of a clutch device 44. The clutch spur gear 42 thus constitutes an output side 40*b* of the second transmission stage 40.

The clutch device 44 is embodied in the form of an overload clutch, in particular an at least two-stage overload clutch 45. As described in greater detail below, the clutch device 44 is embodied in the form of an adjustable clutch device 44. The clutch spur gear 42 is situated on a clutch shaft 46 situated parallel to the transmission shaft 36 and is supported so that it is able to rotate freely thereon. The clutch spur gear 42 is embodied in the form of a hollow disc rim 48 in which a clutch mechanism 50 of the clutch device 44 is accommodated.

The clutch device 44 includes an output gear 54 embodied in the form of a bevel gear 52, which is situated on the clutch shaft 46. In an engaged position of the clutch device 44, the clutch spur gear 42 is operatively connected to the output gear 54 so that a rotary motion of the clutch spur gear 42 is transmitted to the output gear 54.

In the present exemplary embodiment, a switch sleeve 56 is situated on the hammer tube 22. The switch sleeve 56 is connected to the hammer tube 22 for co-rotation therewith, in an axially movable fashion. On an outer circumference surface 58 of the switch sleeve 56, a bevel gear 60 is provided, which is preferably connected to the switch sleeve 56 for co-rotation therewith. With regard to an axial movement V, the switch sleeve 56 has a first switching position and at least one additional second switching position. In the first switching position, the switch sleeve 56 is axially positioned so that the bevel gear 60 engages with the bevel gear 52 of the clutch device 44 so that a rotary motion of the bevel gear 52 is transmitted to the bevel gear 60. This results in a rotary motion of the hammer tube 22. This switching position is depicted in FIG. 1. In the second switching position, not shown, the switch sleeve 56 is axially positioned so that the bevel gear 60 is disengaged from the bevel gear 52 of the clutch device 44, as a result of which the rotary drive of the hammer tube 22 is deactivated.

If the switch sleeve 56 is in the first switching position, then the above-described arrangement can transmit a rotary motion of the motor shaft 26 to the hammer tube 22 and therefore to the tool holder 16 and the insert bit, not shown, contained therein.

The transmission device 20 of the rotary hammer 10 of the exemplary embodiment also has an impact mechanism drive unit 62 for driving an impact mechanism 64. In the present example, the impact mechanism 64 is embodied in the form of an air cushion impact mechanism. In the embodiment shown here, the impact mechanism drive unit 62 is embodied in the form of an eccentric drive 66. To that end, in the present example, the first spur gear 34 has an eccentric pin 68 spaced radially apart from the transmission shaft 36. The first spur gear 34 thus functions as an eccentric wheel 70. By means of a connecting rod 72 or crank rod 73, an impact mechanism piston 74 of the impact mechanism 64 is operatively connected to the eccentric pin 68 and can be driven by it.

There are, however, also possible embodiments of the eccentric drive 66 in which a separate eccentric wheel 70 is provided, which is optionally also situated on the transmission shaft 36 or is driven by means of at least one additional transmission stage. It is also possible in lieu of the eccentric wheel 70 to use an eccentric shaft or crank shaft. Furthermore, the type of impact mechanism drive unit 62 is not essential to the invention so that other impact mechanism drive units known to the person of ordinary skill in the art such as wobble pin drives, coaxial drives, tilting lever drives, or push rod drives can be used in a power tool according to the invention.

The impact mechanism piston 74 is supported in an axially movable fashion in a rear end region 76 of the hammer tube 22. An air cushion 78 and a striking element 80, which is likewise able to move axially in the hammer tube 22, are provided in front of the impact mechanism piston 74 in the direction toward the tool holder 16. In the present example, the rotary hammer 10 also has an intermediate impact die 82 situated in an axially movable fashion in the hammer tube 22 in front of the striking element 80.

If the impact mechanism drive unit 62 drives the impact mechanism piston 74 to execute an oscillating axial motion in the hammer tube 22, then the striking element 80, which is driven in a known fashion by the air cushion 78 functioning as a pneumatic spring, transmits hammering impulses to the intermediate impact die 82, which can in turn transmit the hammering impulses to an insertion end 83 of an insert bit. Since neither the exact design nor the accompanying precise operation of the impact mechanism 64 is essential to the invention, the person of ordinary skill in the art should refer to the relevant, known literature.

Figure 2:
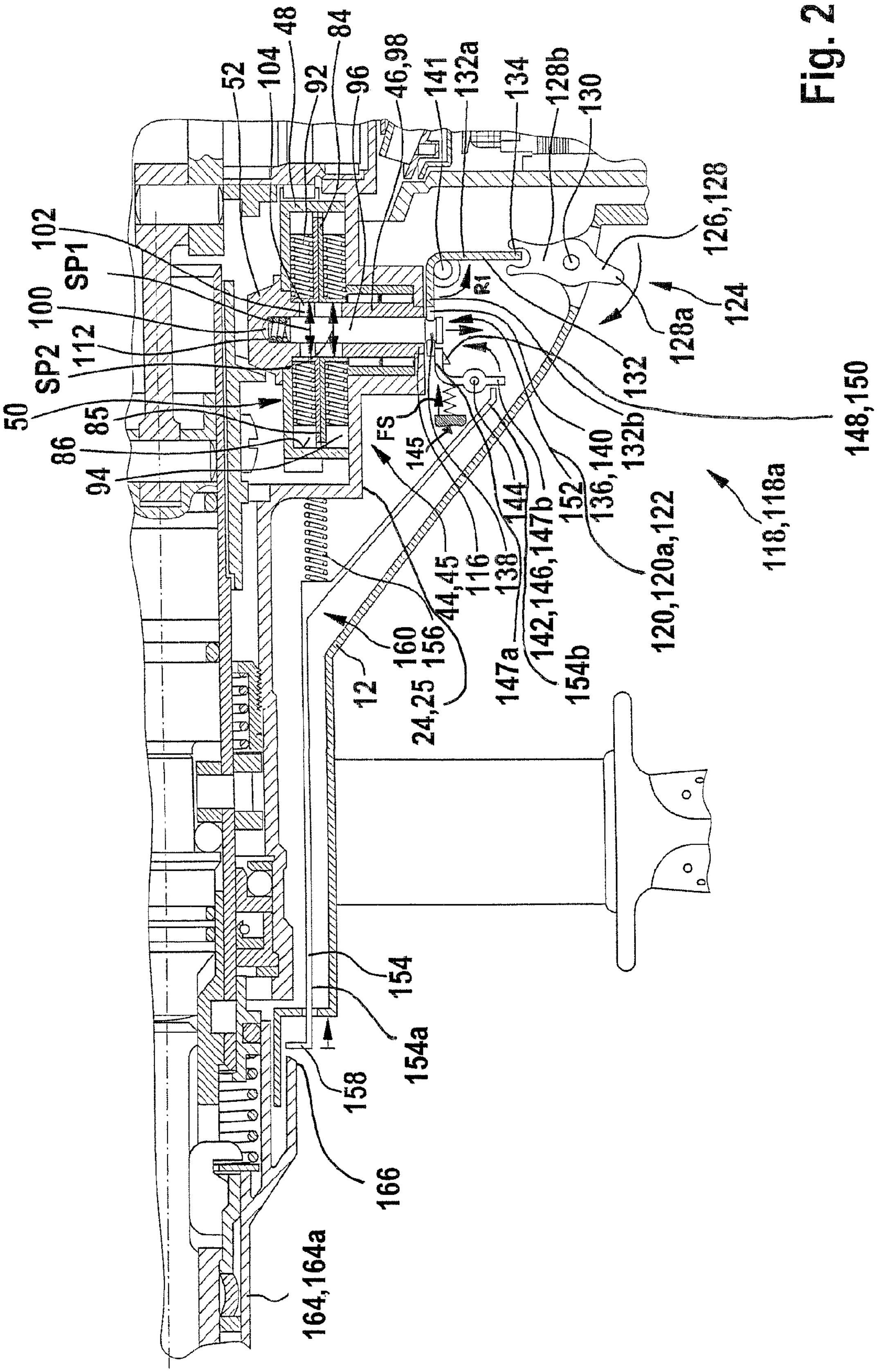
FIG. 2 is an enlarged detail of the rotary hammer from FIG. 1.

FIG. 2 is an enlarged depiction of the region of the clutch device 44 of the rotary hammer 10 from FIG. 1 serving as an example of a power tool according to the invention. The clutch mechanism 50 of the clutch device 44 has a first and second clutch disc 84, 85, which are situated one above the other along the clutch shaft 46 and accommodated in the disc rim 48. On its inner circumference surface 86, the disc rim 48 has detent recesses 88, which are shown the most clearly in FIG. 3*a* or FIG. 3*b*. The detent recesses 88 in this case extend parallel to the clutch shaft 46 in the axial direction and have a detent profile 89 oriented in the circumference direction.

Figure 3A:
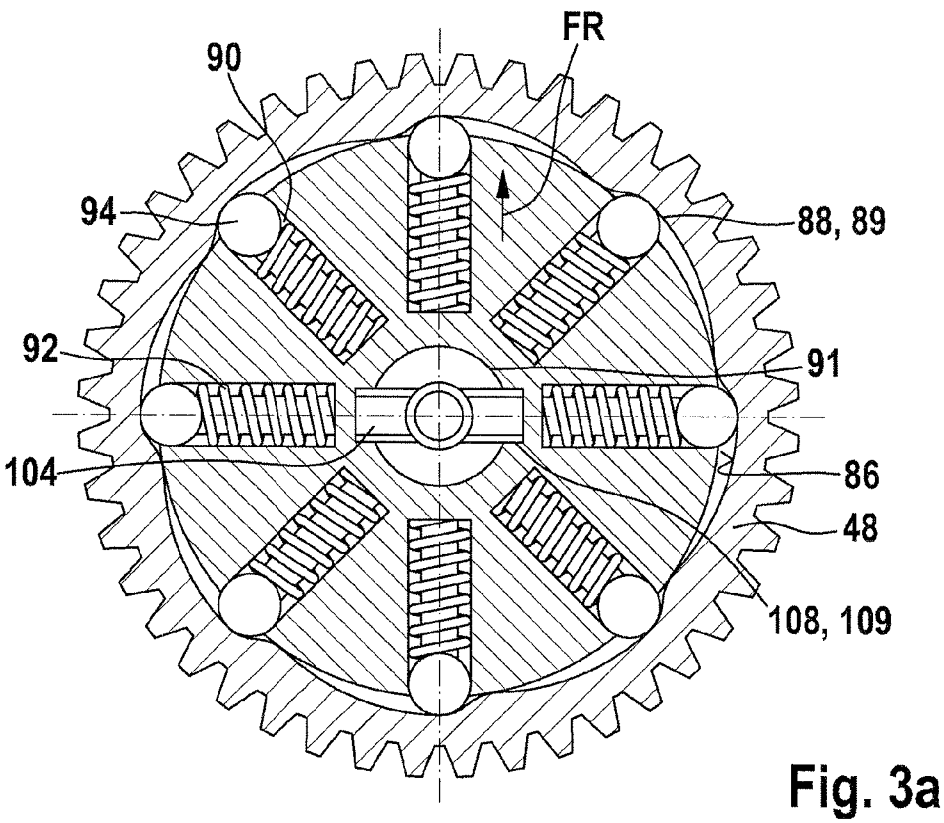
FIG. 3*a* is a view of a clutch device along the cutting line A-A from FIG. 1.
Figure 3B:
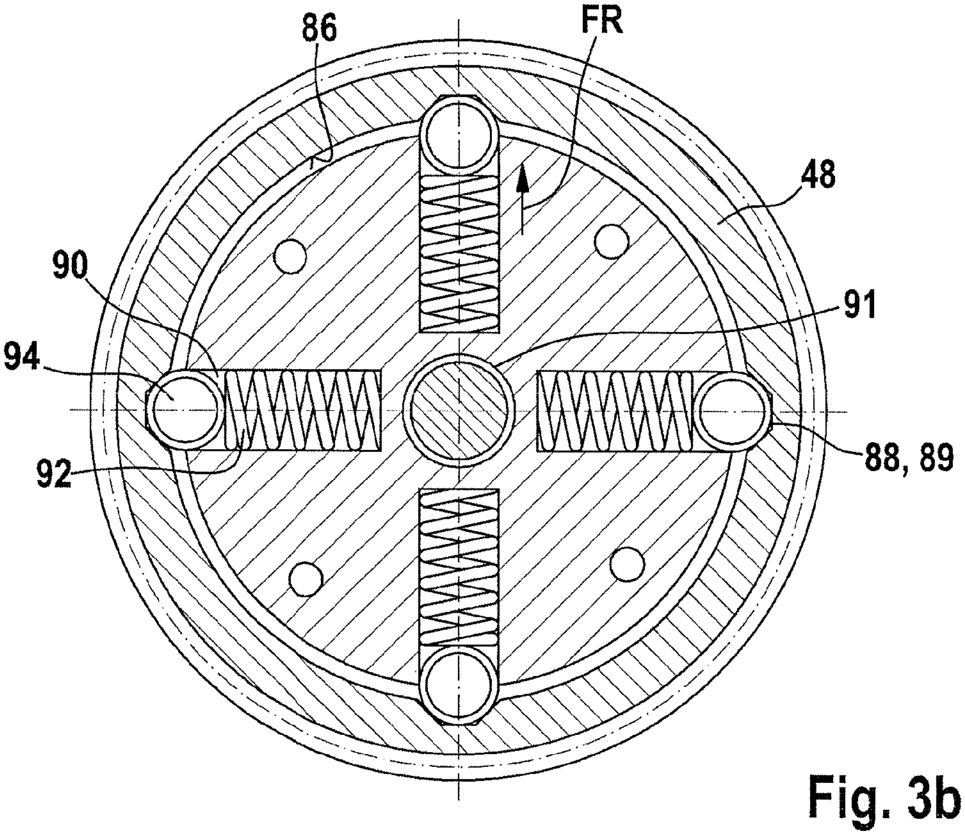
FIG. 3*b* is a view of an alternative clutch device analogous to FIG. 3*a;*

FIGS. 3*a* and 3*b* show two different embodiments that differ from each other both in the embodiment of the detent profile 89 and in the number of detent recesses 88. Radial grooves 90, which open onto the outer diameter and correspond in number to the number of detent recesses 88, are provided in the clutch discs 84, 85. In the inner radial region toward a central bore, the radial grooves 90 are closed by an inner retaining ring 91. Each retaining groove 90 accommodates a spring element 92 embodied in the form of a helical spring and a detent element 94 that is situated in front of the spring element 92 in the direction toward the outer diameter. Preferably, the detent element 94 is embodied in the form of a cylindrical pin or ball. The spring element 92 is prestressed so that the detent element 94 is pressed with a definite detent engagement force FR against the inner circumference surface 86 of the disc rim 48, in particular into the detent recess 88.

The number of detent recesses 88 and corresponding radial grooves 90 can be freely selected. In particular, it is also possible for the number of detent recesses 88 and the number of radial grooves 90 to differ from each other. Preferably, however, a radially symmetrical arrangement of detent recesses 88 and radial grooves 90 over the circumference is selected. The radial symmetry produces the most uniform possible load on the clutch mechanism 50. The embodiments shown in FIGS. 3*a* and 3*b* respectively have eight and four detent recesses 88 and radial grooves 90 distributed uniformly over their circumferences.

An axially movable control slider 96 of a torque selecting device 97 is situated in the clutch shaft 46. For this purpose, the clutch shaft 46 is embodied in the form of a hollow tube 98 that is open at one end, whose preferably closed end 100 has the bevel gear 52 of the clutch device 44 situated on it, preferably formed onto it. The hollow tube 98 is supported in rotary fashion in the transmission support 24 by means of bearings.

The control slider 96 has at least one, preferably two or more, control fins 102 oriented radially outward. These control fins 102 protrude with a free end 104 through corresponding control grooves 106, which are provided in the hollow tube 98. On the circumference surface of the inner diameter, the inner retaining rings 91, 91*a* of the clutch discs 84, 85 have a number of receiving grooves 108, 109 for accommodating the free ends 104 of the control fins 102. The number of receiving grooves 108, 109 in this case is at least equal to the number of control fins 102 of the control slider 96. Through an axial sliding of the control slider 96, the free ends 104 of the control fins 102 can be selectively brought into engagement with the receiving grooves 108, 109 of one of the two clutch discs 84, 85. The control slider 96 is in a first axial control position SP1 when the control fins 102 engage with the receiving grooves 108 of the first clutch disc 84. In a second axial control position SP2, the control fins 102 engage with the receiving grooves 109 of the second clutch disc 85.

In a preferred embodiment, in an intermediate axial position of the control slider 96, the free ends 104 of the control fins 102 can also be brought into engagement with the receiving grooves 108, 109 of both clutch discs 84, 85 simultaneously. The engagement of the free ends 104 of the control fins 102 in the receiving grooves 108, 109 connects the respective associated clutch disc 84, 85 to the hollow tube 98 and therefore to the clutch shaft 46 for co-rotation therewith.

For the sake of simplicity, the discussion below will be limited solely to the variant without an intermediate axial position of the control slider 96. As already indicated above, the prestressed spring elements 92 press the detent elements 94 with the detent engagement force FR into the detent recesses 88 of the disc rim 48. This produces a limit torque MG, which is proportional to the detent engagement force, acting between the disc rim 48 and the hollow tube 98 that the control slider 96 connects to the respective clutch disc 84, 85 for co-rotation therewith.

The effective limit torque MG in this case essentially depends on the value of the detent engagement force FR, the number of pairs of radial grooves 90 and detent recesses 88 of the clutch disc 84, 85, and the geometric embodiment of the detent recesses 88 and/or detent elements 94.

Through an appropriate selection of these parameters, it is possible to provide a first effective limit torque MG1 for the first clutch disc 84, which differs from an effective second limit torque MG2 of the second clutch disc 85. Preferably in this case, the first limit torque MG1 is embodied to be lower than the second limit torque MG2. If the first limit torque MG1 is the lowest possible limit torque MG that can be set with the clutch device 44, it can also be referred to as the lowest possible limit torque MGmin.

In the clutch device 44 of the rotary hammer 10 according to the invention shown in FIG. 2, the control slider 96 is shown in the second control position so that in the depicted state of the rotary hammer 10, the second limit torque MG2 is in effect.

An elastic restoring element 112 is situated at a control fin end of the control slider 96; the elastic restoring element 112 rests with an inner contact surface against the preferably closed end 100 of the hollow tube 98.

At an opposite, free end 116 of the control slider 96, an actuating device 118 is provided. The actuating device 118 has a first switching state and at least one additional switching state. The actuating device 118 has a detent device 120 with a detent engaged position that makes it possible to achieve a releasable locking of the at least one additional switching state. The detent device 120 has a releasing device 122 that makes it possible to release a locked state of the detent device 120 in a release position. The releasing device 122 here can be understood to be an example of a means for resetting the clutch device 44 to a lower limit torque, preferably to the lowest possible limit torque. In addition, the actuating device 118 has a switch unit 124, preferably accessible on the housing 12, for a user to actuate the actuating device 118.

In the first exemplary embodiment according to FIGS. 1 and 2, the actuating device 118 is embodied in the form of a mechanical actuating device 118*a*. The actuating device 118*a* here is an example of a mechanical means according to the core concept of the present invention.

In this case, the switch unit 124 has a switch element 126 that is situated on the housing 12 so that it is accessible to the user. In the present example, the switch element 126 is embodied in the form of a switch lever 128 that is movably accommodated in the housing 12 and protrudes partway out of the housing 12 with one end 128*a*. The switch lever 128 here is embodied so that it can pivot around a pivot axis 130. The pivot axis 130 here is preferably embodied as essentially perpendicular to the clutch shaft 46 of the clutch device 44. At another end 128*b* of the switch lever 128 situated inside the housing 12, a tilting lever 132 is provided. One end 132*a* of the tilting lever 132 protrudes into a recess 134 at the end 128*a* of the switch lever 128. A second end 132*b* of the tilting lever 132 has a fastening element 136. The fastening element 136 connects the tilting lever 132 to the free end 116 of the control slider 96, preferably in a detachable fashion. In the present exemplary embodiment according to FIG. 1 and FIG. 2, the free end 116 of the control slider 96 has a receiving groove 138. The fastening element 136 is embodied in the form of a fastening fork 140 that engages in the receiving groove 138. The tilting lever 132 is embodied so that it can pivot around a tilting lever axis 141 that is oriented essentially perpendicular to the clutch shaft 46 of the clutch device 44.

The detent device 120 of the actuating device 118*a* is embodied as a locking device 120*a*. The locking device 120*a* has a locking lever 142, a locking lever pivot axis 144, and a closing element 145. The locking lever 142 is embodied in the form of an angle lever 146. Spaced apart from the tilting lever axis 141, a first end of the angle lever 146, on the left end when viewed in FIG. 2, is bent toward the control slider 96 at an angle, preferably a right angle, to a first lever arm 147*a*, which is preferably parallel to the clutch shaft 46. The first end of the angle lever 146 is provided with a detent element 148, which is preferably formed onto it. The detent element 148 here is a detent engagement profile 150 extending parallel to the clutch shaft 46. On a side oriented away from the clutch device which is located on the bottom side of the first arm 147*a* as viewed in FIG. 2, the detent engagement profile 150 is embodied so that it slopes downward in a wedge shape toward the first end which is located on the top side of the first arm 147*a*. On the opposite side oriented toward the clutch device 44, the detent engagement profile 150 is embodied as essentially flat.

The closing element 145 is situated between the part of the first lever arm 147*a*, which preferably extends parallel to the clutch shaft 46, and a support surface that is fixed relative to the locking lever 142. In the embodiment shown here, the closing element 145 is embodied in the form of a helical spring. The closing element 145 is embodied and situated so that the locking lever 142 is returned to a preferred rest position. FIG. 2 shows the locking lever 142 in this rest position.

In this rest position, the detent element 148 at the first end of the locking lever 142 covers over a pivoting region 152 of the second end 132*b* of the tilting lever 132 so that a pivoting motion of the tilting lever 132 is essentially only possible in a first pivoting direction R1 coming from the direction of the side of the detent engagement profile 150. If the second end 132*b* of the tilting lever 132 sweeps across the location of the detent element 148 in a pivoting motion in the pivoting direction R1, then this briefly deflects the locking lever 142 in opposition to a closing force FS of the closing element 145. If the pivoting motion in the pivoting direction R1 continues, then the closing element 145 moves the locking lever 142 back into its rest position. With a movement in the pivoting direction R1, the control slider 96 is also slid in opposition to the force of the restoring element 112 into a second axial control slider position SP2 from a first axial control slider position SP2. A pivoting motion of the tilting lever 132 in a second pivoting direction which is opposite to R1 in the direction extending away from the side 150*b* of the detent engagement profile 150 is to a large extent obstructed by the essentially flat embodiment of the detent engagement profile 150 on the side 150*b* of the detent element 148. This prevents a spontaneous restoring of the control slider 96 from the second control slider position SP2 selected by the user into the first control slider position SP1. Preferably, an obstructing action of the detent device 120 is designed so that by manually actuating the switch element 126, it is possible to release the detent device 120 so that the user can switch back into the control position SP1 and therefore to the first limit torque MG1.

On essentially the opposite side of the locking lever pivot axis 144 from the first lever arm 147*a*, a second, preferably straight, lever arm 147*b* is provided. It is embodied as freely movable to a large extent, when moving in the first pivoting direction R1. On a side of the second lever arm 147*b* oriented away from the clutch shaft 46, a control rod 154 is provided as a mechanical element 155 of the releasing device 122.

In addition to the control rod 154, the releasing device 122 has a restoring element 156, which in the present exemplary embodiment according to FIG. 1 and FIG. 2, rests against the transmission support 24. The control rod 154 is embodied in the form of an angled push rod. At an end 154*a* oriented toward the tool holder 16, it protrudes with a sensing element 158 out from the end of the housing 12 oriented toward the tool holder 16. A second end 154*b* of the control rod 154 is situated on the side of the second lever arm 147*b* oriented away from the clutch shaft 46, preferably directly adjacent to it, and particularly preferably, is in contact with the second lever arm 147*b*. In an angled transition region 160 of the control rod 154, a contact surface 162 is provided. The restoring element 156 is provided between this contact surface 162 and another contact surface on the transmission support 24. The restoring element 156 here produces a restoring force oriented in the direction of the tool holder 16, which holds the control rod 154 in an axial starting position.

The tool holder 16 has a first actuating element 164. The first actuating element 164 permits the user to unlock an effective locking of a tool socket of the tool holder 16. After the unlocking action is completed, an insert bit can be removed or replaced. Tool holders 16 of this kind have been long known to the person of average skill in the art; a detailed description has therefore been omitted at this point. In the present exemplary embodiment, the first actuating element 164 is embodied in the form of an actuating sleeve 164*a*. To execute the unlocking action, the user moves the actuating sleeve 164*a* in the direction toward the power tool in order to trigger the release.

In the first exemplary embodiment of the power tool according to the invention, the sensor element 158 is situated so that when the user actuates the actuating sleeve 164*a*, a contact surface 166 at its end exerts a pressure on the sensor element 158. This pressure slides the control rod 154 in the housing 12 axially toward the clutch device 44 in opposition to the restoring force of the restoring element 156. This axial sliding motion is transmitted by the second end 154*b* of the control rod 154 to the second lever arm 147*b* of the locking lever 142. As a result, the locking lever 142 is pivoted out of its rest position in opposition to the closing force of the closing element 145, unblocking the pivoting region 152 of the tilting lever 132. Then, the restoring force of the restoring element 112 moves the control slider 96 back into the first axial control position SP1. This triggers an automatic reset to the lowest possible limit torque MGmin of the clutch device 44 resulting from a removal and/or replacement of the tool in the tool holder 16.

In addition to the embodiment of a mechanical actuating device 118*a* described in the first exemplary embodiment, the person of ordinary skill in the art is also aware of alternative mechanical devices for one-sided lockable switching of at least two control slider positions SP1, SP2 of a control slider 96. In particular, different switch elements 126 such as rotary switches, rocker switches, slide switches, or the like can be used according to the invention to manually operate the clutch device 44. The transmission from the actuating device 118*a* to the control slider 96 can also be embodied in a different, known fashion without requiring changes essential to the invention. For example in lieu of the tilting lever 132, it is also possible to use actuating rods, pulling devices such as cable pulls or Bowden cables, or devices of this nature. Also, different detent devices 120 and/or releasing devices 122 can be provided. In addition, the transmission of the actuation of the first actuating element 164 can also, for example, be alternatively embodied in the form of a lever, slider, or pulling device without affecting the character of the invention.

Figure 4:
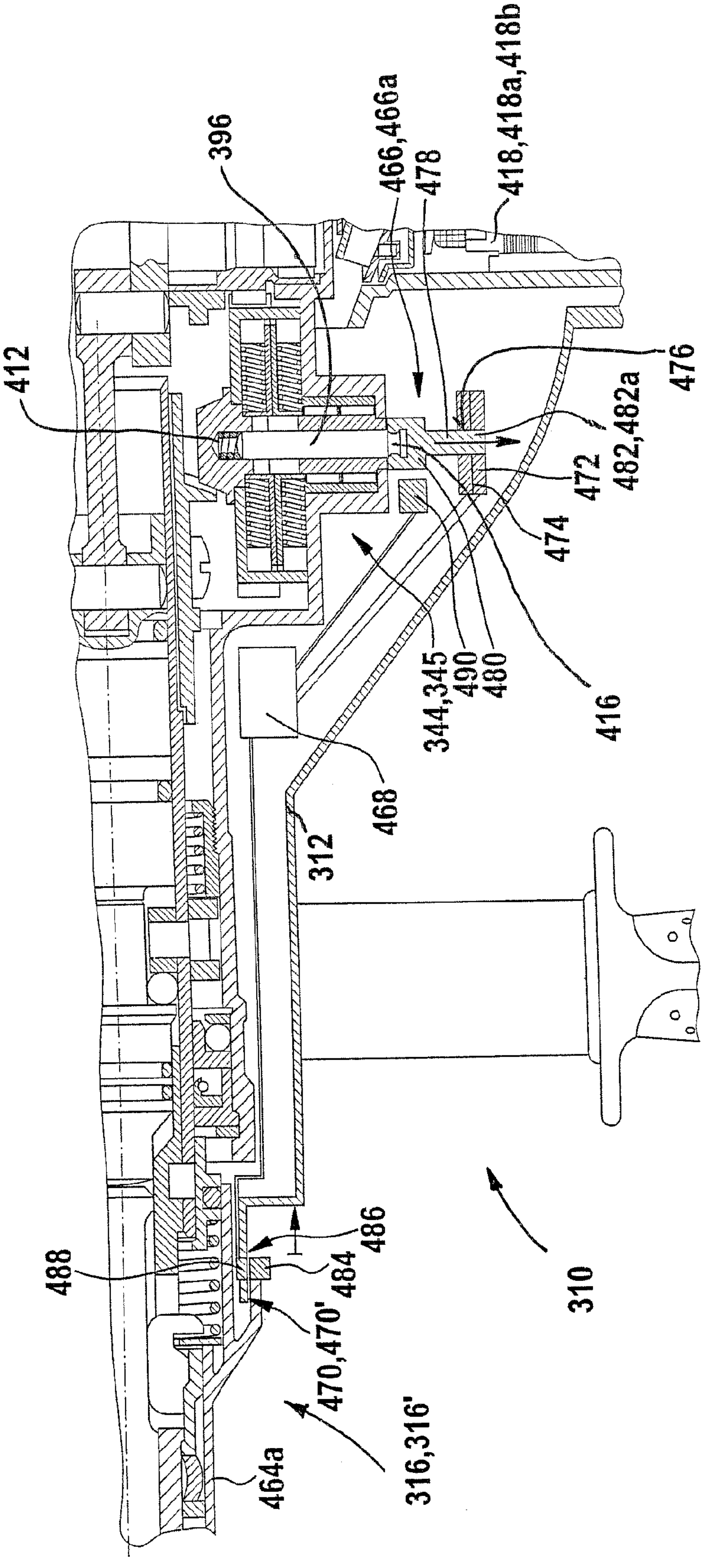
FIG. 4 is an enlarged side view of a second exemplary embodiment.

FIG. 4 shows a second exemplary embodiment of a power tool according to the invention that will be described below.

The basic design of the rotary hammer 310 in this exemplary embodiment corresponds to that of the first exemplary embodiment; the reader is therefore referred to the description given in the preceding paragraphs. Parts that are the same or function in the same manner have been provided here with the same reference numerals, increased by 300.

By contrast with the first exemplary embodiment, the actuating device 418 (only partially shown) is embodied as an electromechanical actuating device 418*b*. The actuating device 418*a* here is an example of an electromechanical means according to the core concept of the present invention. The actuating device 418*b* is equipped with an actuator 466. In the present example, the actuator 466 is embodied in the form of a solenoid 466*a*. The actuating device 418*b* preferably also includes a control unit 46R and at least one first sensor unit 470.

The solenoid 466*a* has an electromagnet 472 preferably embodied in the form of an annular coil. The electromagnet 472 has a guide bore 476 provided in the transverse plane 474. A magnet armature 478 is provided, which is situated so that it can move axially along the guide bore 476. In a preferred embodiment, the transverse plane 474 is oriented perpendicular to the clutch shaft 346 of the clutch device 344. In a particularly preferred embodiment of the power tool according to the invention, the guide bore 476 of the electromagnet 472 is oriented parallel to the clutch shaft 346, in particular coaxial thereto.

In the present exemplary embodiment, the magnet armature 478 is primarily embodied in the form of a pin. At an end of the magnet armature 478 oriented away from the electromagnet 472, a fastening device 480 is provided. This fastening device 480 is fastened to the free end 416 of the control slider 396 of the clutch device 344, 345. In the present example, the control slider 396 has a receiving groove 438 to produce a form-locked connection between the fastening device 480 of the magnet armature 478 and the free end 416 of the control slider 396. Naturally, different fastening geometries can be used for producing a form-locked connection between the control slider 396 and the magnet armature 478 or other fastening concepts can be used, without being essential to the invention. In particular, the magnet armature 478 and the control slider 396 can also be embodied as a single component.

A permanent magnet 482 is situated at an end of the magnet armature 478 oriented toward the electromagnet 472 so that with a transition from an unpowered state of the electromagnet 472 to a powered state, the magnet armature 478 is brought from a first switching position into at least one second switching position. In the present example according to FIG. 4, the permanent magnet 482 is embodied in the form of a rod magnet 482*a*. The rod magnet 482*a* in this case constitutes a shaft of the magnet armature 478.

The electromagnet 472 of the solenoid 466*a* is electrically connected to the control unit 468. The control unit 468 here can switch back and forth between the unpowered state of the electromagnet 472 and the powered state.

In the exemplary embodiment of the power tool according to the invention shown in FIG. 4, the restoring element 412, in keeping with the first exemplary embodiment described above, moves the control slider 396 from the second control slider position SP2 back into the first control slider position SP1 (FIG. 2). If the electromagnet 472 is switched into the powered state, then a restoring force of the restoring element 412 is overcome and the control slider 396 is slid from the first control slider position SP1 into the second control slider position SP2. For selecting the control position and therefore the selected limit torque MG of the clutch device 344, 345, the control unit 468 can be operated by means of a selector element 369 such as a switch, a button, a sensor field, etc. provided on the housing 312 so that it is accessible to the user.

The control unit 468 is connected to the first sensor unit 470 via a second electrical connection. The first sensor unit 470 is used to monitor an actuation state of the first actuating element 464 on the tool holder 316 of the power tool according to the invention. The first sensor unit 470 can have a mechanical contact sensor—e.g. a button—or can have a contactless motion sensor.

In the present exemplary embodiment according to FIG. 4, the first sensor unit 470 is embodied as a contactless motion sensor, in particular a Hall sensor 471. A triggering ring 484 is provided in the first actuating element 464 embodied in the form of an actuating sleeve 464*a*. The actuating sleeve 464*a* here encompasses a cylindrical end region 486 of the housing 312. A sensor element 488 of the contactless motion sensor is situated in an outer circumference surface of the cylindrical end region 486 so that the triggering ring 484 encompasses the sensor element 488 in the circumference direction and is spaced radially apart from it. In the present embodiment, the sensor element 488 is embodied in the form of a Hall sensor. The triggering ring 484 is preferably composed of a permanently magnetic material so that a movement of the actuating sleeve 464*a* and therefore of the triggering ring 484 in the axial direction relative to the Hall sensor produces a detectable Hall voltage as a sensor signal in the Hall sensor 488*a*. The sensor signal is transmitted to the control unit 468, making it possible to monitor the actuation state of the first actuating element 464.

The operation of the second exemplary embodiment corresponds to that of the first exemplary embodiment described above. The user can set the limit torque MG of the clutch device 344 by means of the selector element 369. In particular, it is possible to switch from a first limit torque MG1, functioning as the lowest possible limit torque MGmin, up to at least one second limit torque MG2, which is higher than the first limit torque MG1. If in the course of a tool replacement required in the work, the first actuating element 464 of the power tool is actuated, then the first sensor unit 470 detects this and communicates it to the control unit 468 in the form of a sensor signal. In the control unit 468, the sensor signal triggers a switch from the powered state of the electromagnet 472 into the unpowered state, as a result of which the control slider 396 of the clutch device 344 is moved back into the first control position SP1. The control unit 468 and the first sensor unit 470 therefore function as a means for resetting the clutch device 344 to a lower limit torque, preferably the lowest possible limit torque.

The person of ordinary skill in the art can produce possible enhancements by making obvious modifications to the arrangement of the sensor element 488 and the triggering ring 484 on the power tool according to the invention. Likewise, alternative embodiments are produced, without impinging on the core concept of the invention, by using alternative sensor principles in the first sensor unit 470, e.g. inductive or capacitive sensor technology.

In another modification, in a clutch device 344 with an electromechanical actuating device 418*b*, the actuating device 466 can be embodied so that it is possible to eliminate the restoring element 412. In this case, the actuating device 466 has at least two stable switching states between which it can be switched by means of the control unit 468.

In a preferred modification, a second sensor unit 490 is provided. The second sensor unit 490 monitors the switching position of the actuating device 466 and/or the control position of the control slider 396. The second sensor unit 490 here is likewise electrically connected to the control unit 468 so that the control unit 468 can evaluate the current switching state of the clutch device 344 by means of a second sensor signal of the second sensor unit 490.

In a particularly preferred embodiment, the control unit 468 of the power tool according to the invention includes a control logic for a monitoring of an availability of a supply voltage. If there is an interruption in the supply voltage, the control unit 468 triggers a resetting of the clutch device 344 to the lowest possible limit torque.

The above-described functionality can also be transferred analogously to known power tools with detachable, in particular replaceable, tool holders 316'. To accomplish this, the replaceable tool holder 316' is provided with an additional sensor unit 470' that monitors an actuation of a second actuating element 164' and transmits the result to the control unit 468 in an analogous fashion.

Other modifications are achieved by transferring the concept of the invention to alternative clutch devices. For example, in lieu of the overload clutch described here, with detent elements acting in the direction toward a clutch disc plane, it is possible to use overload clutches with detent elements oriented transversely relative to the clutch disc. In lieu of detent clutches, it is also possible to use multistage friction clutches.

It is also possible to vary the arrangement of the clutch device 44, 45 in the transmission device 20. For example, it can in particular be advantageous to situate the clutch device 44 on the hammer tube 22. To accomplish this, it is possible to use advantageous clutch discs equipped with detent or friction elements oriented transversely relative to the respective clutch disc, for example in the form of a one-stage clutch, as is known from DE 43 04 899 A1. This, too, can be referred to as an adjustable clutch device 44.

The concept of the invention can also be transferred without limitation to a transmission device 20 with a clutch device 44 equipped with two one-stage clutch devices 44*a*, 44*b* that are situated in distributed fashion and have different limit torques MG1 and MG2, as is known, for example, from DE 43 04 899 A1. In a power tool of this kind, an inhibiting device with a restoring device can be provided, which makes it possible to inhibit at least one of the two clutch devices 44*a*, 44*b* in such a way that the clutch device 44*a* with the lowest possible limit torque MGmin is inhibited and the clutch device 44*b* with the higher limit torque is activated. The restoring device is operatively connected to the first actuating sleeve of the tool holder so that upon activation of the first actuating sleeve the inhibiting of the clutch device 44*a* with the lowest possible limit torque MGmin is released and it becomes effective again.

In addition, the concept of the invention can be transferred without limitation to a transmission device 20 with a one-stage adjustable clutch device 44*c* having a variable limit torque MGV, as is known among other things from DE 101 30 520 A1. In a clutch device 44*c* of this kind, a control mechanism is provided that makes it possible to vary the prestressing force of the spring elements 92*c* of the clutch mechanism 50*c*. Otherwise, the operation corresponds to that of the above-described clutch device 44, 45. If this control mechanism is connected to one of the above-described actuating devices 118, 318 so that the actuation of the first actuating element 164, 464 triggers a resetting to the lowest prestressing force of the spring elements 92*c*, then this interaction corresponds to the claimed concept of the invention.

In a preferred enhancement, the power tool according to the invention has at least one optical, acoustic, and/or haptic signal generator, which is/are activated upon application of a limit torque at the clutch device 44, 45 that differs from the lowest possible limit torque. In addition, a display element can be provided on the power tool according to the invention, which gives the user a visual display the currently selected limit torque.

The person of ordinary skill in the art will produce other modifications and enhancements through obvious combination of the above-described features.

Figure 5:
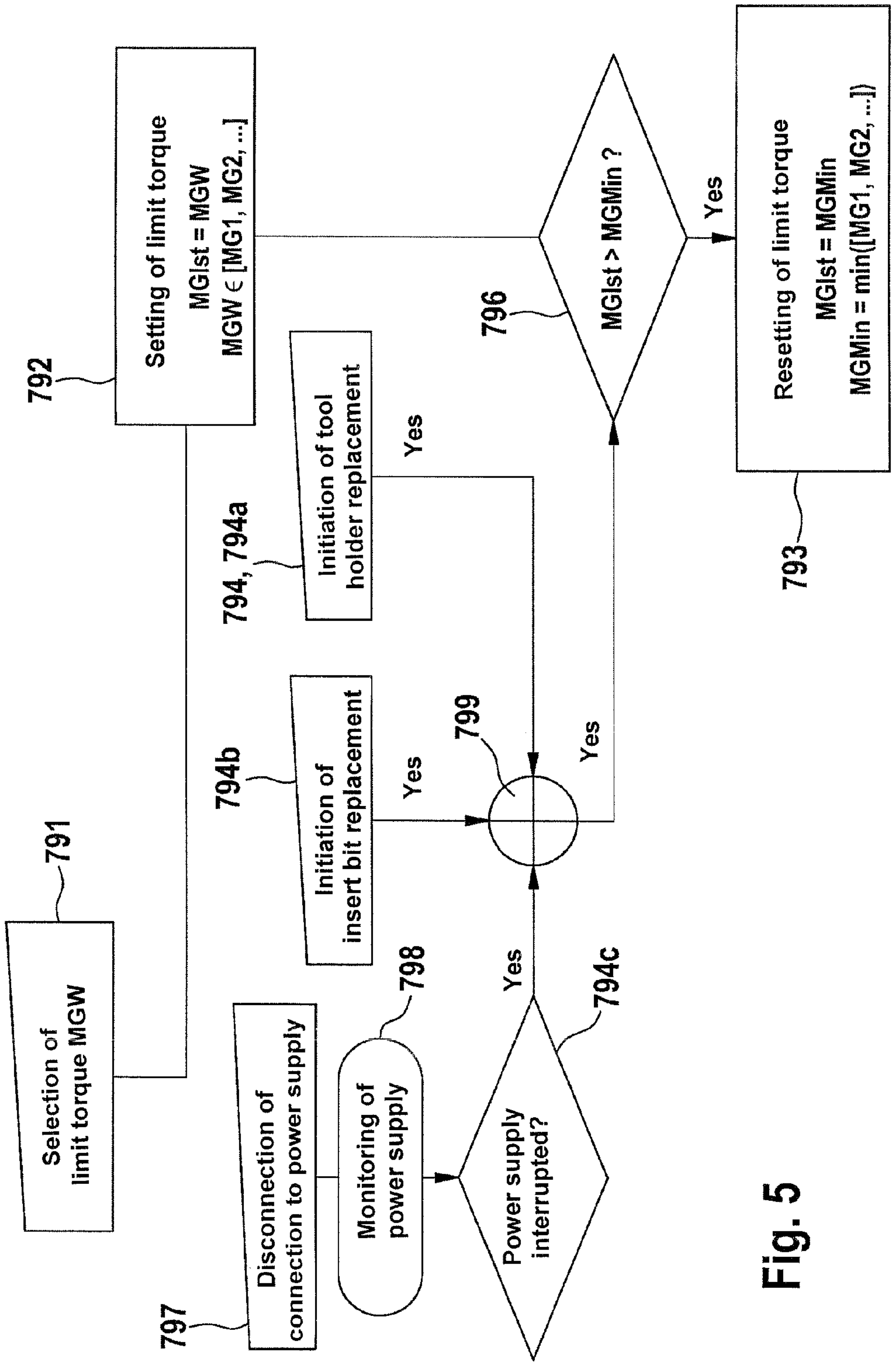
FIG. 5 shows a flowchart of the proposed method for operating a power tool.

FIG. 5 shows the invention-relevant steps of a method for operating a power tool, in particular an electrically operable hand-held power tool, that has at least one tool drive shaft for directly or indirectly driving an insert bit in rotary fashion, in particular according to one of the above-described exemplary embodiments, schematically embodied in the form of a flow-chart. Features that are the same or that function in the same manner as those described in the examples above have been provided here with the same reference numerals.

If in the course of a work process, it becomes necessary to change the limit torque MGW of the clutch device 44, 344 that is provided between the drive unit 19 and the tool drive shaft 23 and couples them to each other, then the user selects the desired limit torque MGW in a first step 791. The power tool according to the invention is provided with a corresponding actuating device 718 for this purpose, which acts on the torque selecting device 97, 397. Then in a second process step 792, the torque selecting device 97, 397 adjusts the currently prevailing limit torque MGIst to the desired limit torque MGW. Examples for the actuating device 718 and the torque selecting device 97, 397 are described in the preceding exemplary embodiments, the descriptions of which are included herein by reference. The user can use this sub-process to both increase and decrease the currently prevailing limit torque MGIst.

According to the invention, an additional sub-process 793 is initiated as soon as at least one corresponding process prerequisite is met. In step 794, an initiation of a removal, insertion, and/or replacement of the insert bit in the tool holder 16, 316 of the power tool is monitored as a first possible process prerequisite 794*a*. As in the exemplary embodiments described above, step 794 can be embodied in the form of a monitoring of an actuation state of the first actuating element 764. Alternatively, a tool socket of the tool holder 16, 316 can be directly monitored for the presence of the insertion shaft 83 of the insert bit. If the above-mentioned event occurs, then in a next step 795, a resetting of the clutch device 44, 344 to the lowest possible limit torque MGMin is triggered. As described above, the clutch device 44, 344 can be provided with a torque selecting device 697 for this purpose, which, in a starting position, sets the lowest possible limit torque MGMin of the adjustable clutch device 44, 344. In a preferred embodiment, a resetting of the torque selecting device 97, 397 into its starting position is triggered in step 795.

In a preferred modification, step 795 is preceded by an additional testing step 796 that compares the currently selected limit torque MGIst to the lowest possible limit torque MGMin. Only if MGIst is actually greater than MGMin is a resetting according to step 795 triggered.

In another preferred modification, step 794 includes a second alternative process prerequisite 794*b*. In this case, the power tool is monitored for an initiation of a replacement of a replaceable tool holder 316' and upon occurrence of an event 794*b*, the step 795 is initiated. In the examples described further above, a second actuating element 764*b* for replacing the replaceable tool holder 316' is provided and its actuation state is correspondingly monitored.

Another preferred modification of the method according to the invention includes an additional sub-process for monitoring the power supply to the power tool. If a connection to a voltage source is disconnected in step 797, a monitoring unit 798 emits a corresponding signal. This signal, as a process prerequisite 794*c* analogous to the process prerequisites 794*a*, 794*b* described above, is classified as a trigger for the process step 793.

In a preferred embodiment of the method according to the invention, an OR operation 799 is used for a particularly robust processing of the signals of the process prerequisites 794*a*, 794*b*, 794*c*.

In addition to the process prerequisites 794, 794*a*, 794*b*, 794*c* described here, other monitoring values such as a change in operating mode of the power tool can conceivably be used as process prerequisites 794, yielding practical modifications of the concept of the invention described herein that are obvious for the person of ordinary skill in the art.

Figure 6:
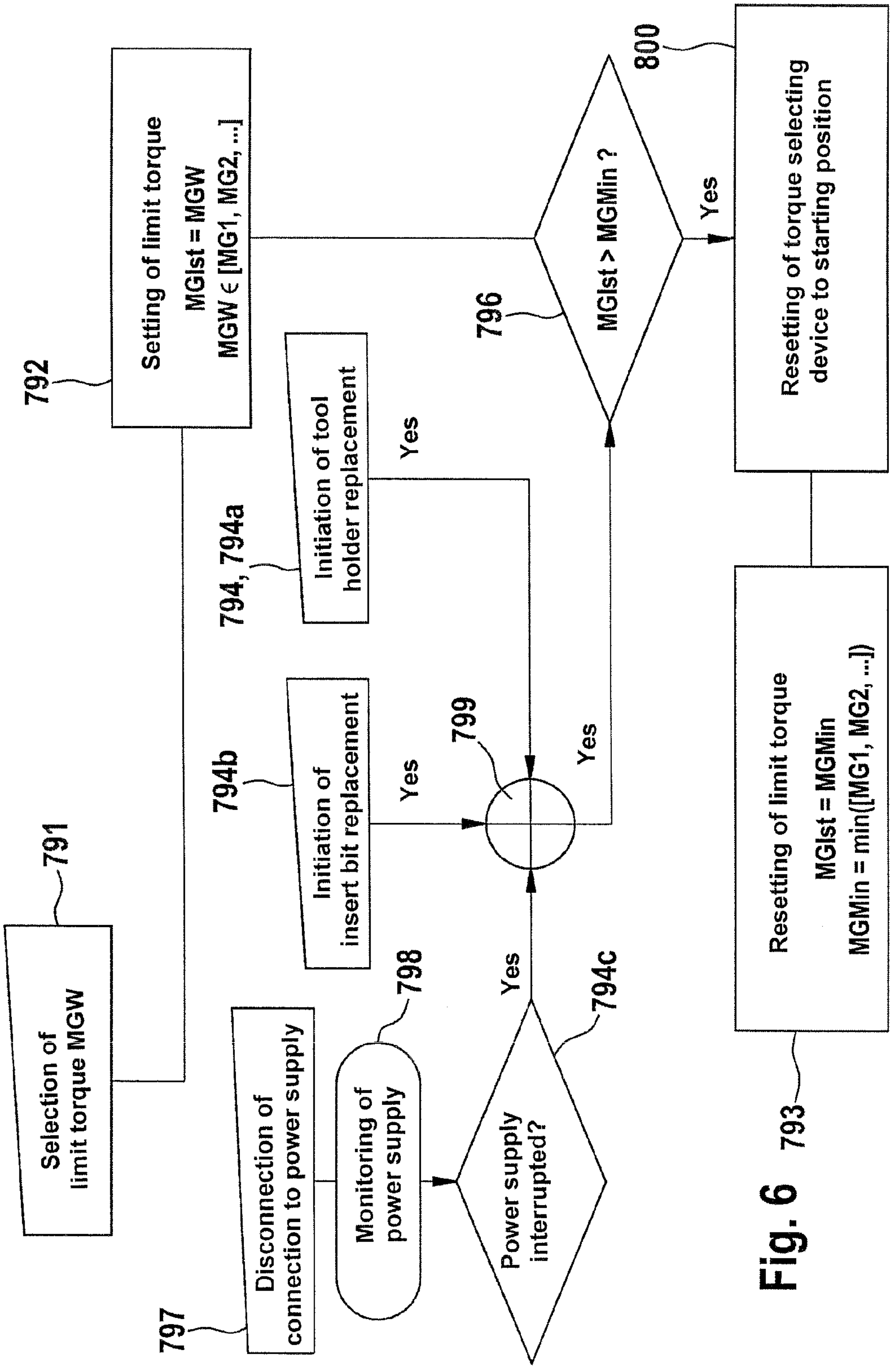
FIG. 6 shows a flowchart of a variant of the method from FIG. 5.

FIG. 6 shows a variant of the flowchart disclosed in FIG. 5. In the variant shown here, the process prerequisites 794, 794*a*, 794*b*, 794*c* trigger a resetting of the torque selecting device 97, 397 into its starting position. The resetting of the torque selecting device 97, 397 triggers a resetting of the clutch device 44, 344 to the lowest possible limit torque.

In a preferred modification of the above-described method, upon application of a limit torque MGIst that differs from the lowest possible limit torque MGMin, a signal generator provided in the power tool is activated. The signal generator in this case can be embodied in the form of an optical, acoustic, and/or haptic signal generator.

The foregoing relates to the preferred exemplary embodiments of the invention, it being understood that other variants and embodiments thereof are possible within the spirit and scope, of the invention, the latter being defined by the appended claims.

The invention claimed is:

1. A method for operating a power tool that has at least one tool drive shaft for driving an insert bit in rotary fashion, with the insert bit being accommodated in a tool holder that is detachably connected to the power tool, in which at least one drive device is coupled to the at least one tool drive shaft via at least one clutch device, the method comprising resetting the clutch device to a lower limit torque, above which the clutch device decouples the at least one drive device from the at least one tool drive shaft, upon removal or attachment of one of the insert bit and the tool holder, wherein at least two different, user-selectable, limit torques are provided for the clutch device, and wherein upon removal or attachment of one of the insert bit and the tool holder, the clutch device is automatically reset to a lowest possible of the at least two limit torques.

2. The method as recited in claim 1, wherein upon actuation of a first actuating element for removing the insert bit from the tool holder, an automatic resetting of the clutch device is triggered to the lowest possible of the at least two limit torques.

3. A method for operating a power tool that has at least one tool drive shaft for driving an insert bit in rotary fashion, with the insert bit being accommodated in a tool holder that is detachably connected to the power tool, in which at least one drive device is coupled to the at least one tool drive shaft via at least one clutch device, the method comprising resetting the clutch device to a lower limit torque, above which the clutch device decouples the at least one drive device from the at least one tool drive shaft, upon removal or attachment of one of the insert bit and the tool holder, wherein at least two different, user-selectable, limit torques are provided for the clutch device, and, wherein upon insertion of an insert bit into the tool holder, the clutch device is automatically reset to a lowest possible of the at least two limit torques.

4. The method as recited in claim 2, wherein upon actuation of a second actuating element for replacing the replaceable tool holder, an automatic resetting of the clutch device is triggered to the lowest possible of the at least two limit torques.

5. A method for operating a power tool that has at least one tool drive shaft for driving an insert bit in rotary fashion, with the insert bit being accommodated in a tool holder that is detachably connected to the power tool, in which at least one drive device is coupled to the at least one tool drive shaft via at least one clutch device, the method comprising resetting the clutch device to a lower limit torque, above which the clutch device decouples the at least one drive device from the at least one tool drive shaft, upon removal or attachment of one of the insert bit and the tool holder, wherein at least two different, user-selectable, limit torques are provided for the clutch device, and wherein in a starting position, a torque selecting device of the clutch device sets a lowest possible limit torque of the clutch device.

6. The method as recited in claim 5, wherein the torque selecting device is configured to be locked in a currently selected switching position.

7. The method as recited in claim 5, wherein a removal and/or insertion and/or replacement of an insert bit in the tool holder and/or of the replaceable tool holder is detected and acts on the torque selecting device, which is provided in the clutch device in such a way that the torque selecting device is reset into its starting position.

8. A method for operating a power tool that has at least one tool drive shaft for driving an insert bit in rotary fashion, with the insert bit being accommodated in a tool holder that is detachably connected to the power tool, in which at least one drive device is coupled to the at least one tool drive shaft via at least one clutch device, the method comprising resetting the clutch device to a lower limit torque, above which the clutch device decouples the at least one drive device from the at least one tool drive shaft, upon removal or attachment of one of the insert bit and the tool holder, wherein at least two different, user-selectable, limit torques are provided for the clutch device, and wherein when there is an interruption in the power supply to the power tool, the clutch device is reset automatically to a lowest possible of the at least two limit torques.

9. The method as recited in claim 8, wherein at least one optical, acoustic, and/or haptic signal generator is provided, which is activated upon application of a limit torque other than the lowest possible limit torque in the clutch device.

10. A method for operating an electric hand-held power tool having (i) at least one tool drive shaft configured to drive an insert bit in rotary fashion, (ii) a drive shaft, (iii) a tool holder in which the insert bit is accommodated, and which is removably connected to the drive shaft, (iv) a drive device coupled to the drive shaft, and (v) at least one clutch device interposed between the drive shaft and the drive device and having at least two user-selectable limit torques, above which the at least one clutch device decouples the drive shaft from the drive device, the method comprising:

automatically resetting the clutch device to a lowest limit torque of the at least two limit torques in response to replacement of one of the insert bit and the tool holder.

11. The method as recited in claim 10, further comprising:

actuating a first actuating element in response to removal of the insert bit from the tool holder; and triggering the automatic resetting of the clutch device to the lowest limit torque in response to actuation of the first actuating element.

12. The method as recited in claim 10, further comprising:

automatically resetting the clutch device to the lowest limit torque of the at least two limit torques in response to insertion of an insert bit into the tool holder.

13. The method as recited in claim 11, further comprising:

actuating a second actuating element in response to replacement of the tool holder on the drive shaft; and triggering the automatic resetting of the clutch device to the lowest limit torque in response to actuation of the second actuating element.

14. The method as recited in claim 10, further comprising:

setting a torque selecting device of the clutch device to the lowest possible limit torque in a starting position.

15. The method as recited in claim 14, further comprising:

resetting the torque selecting device to the starting position in response to detection of one of (i) removal of the insertion bit from the tool holder, (ii) insertion of the insert bit in the tool holder, and (iii) replacement of the tool holder on the drive shaft.

16. The method as recited in claim 10, further comprising:

automatically resetting the clutch device to the lowest limit torque in response to an interruption in the power supply to the power tool.

17. The method as recited in claim 10, further comprising:

generating at least one of an optical signal, an acoustic signal, and a haptic signal in response a selected limit torque of the at least two limit torques being different from the lowest limit torque.

* * * * *